Patented June 5, 1928.

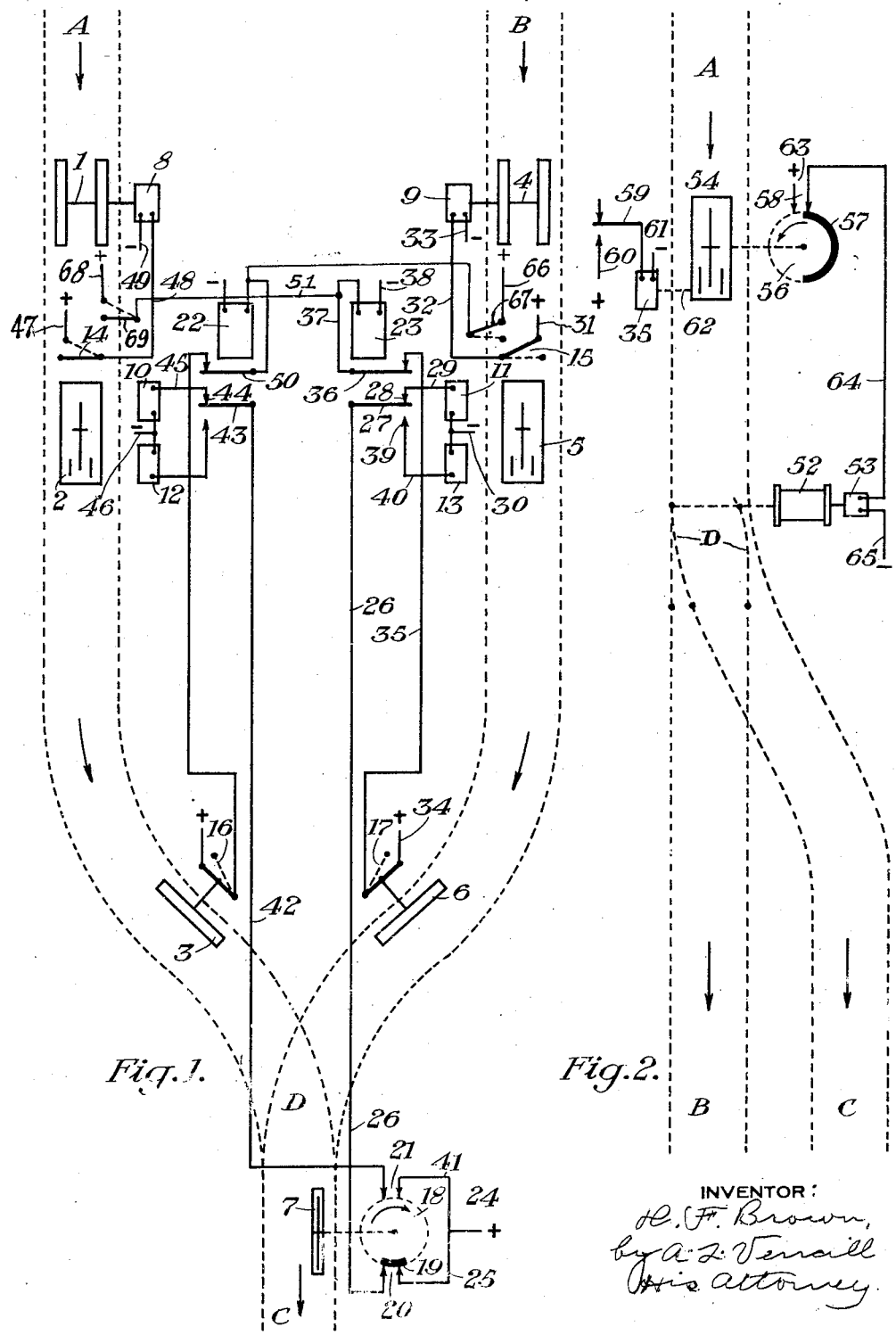

1,672,364

UNITED STATES PATENT OFFICE.

DONALD F. BROWN, OF LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA.

CONTROL OF TUBS OR TRUCKS IN COLLIERIES OR THE LIKE.

Application filed March 21, 1924, Serial No. 700,966, and in Great Britain July 4, 1923.

My invention relates to the control of tubs or trucks such as are commonly employed in collieries and the like, and has for its object to provide means for automatically controlling the delivery of vehicles of this description upon converging and diverging tracks.

Various arrangements have been proposed and are now in general use for controlling the passage of vehicles of this description over a selected portion or portions of the track, in some cases the axle or other portion of the vehicle being arranged to engage with and effect the operation of a device adapted automatically to retard the speed of the vehicle or vehicles prior to the arrival of the latter at a point in the track at which of the latter is located a counting device, the latter of which may be arranged to record the number of vehicles and permit the passage of a predetermined number of vehicles in succession whereupon the device is moved or moves to a position to prevent the passage of further vehicles until a releasing operation has been effected.
My present invention contemplates in certain circumstances the employment of retarding and counting mechanism of this general character, but essentially utilizes a device or devices which permit the passage of a selected number of vehicles only, and subsequently effects a complete braking or stoppage of the remainder of the vehicles until the device is released.

According to my present invention a system of automatic control is provided for use upon converging or diverging tracks, whereby a predetermined number of vehicles released from a single track may be equally or otherwise distributed upon diverging tracks, or, in the case of converging tracks, a predetermined number of vehicles may be delivered alternately or in succession from such tracks on to the single track.

My invention is illustrated by way of example in the accompanying drawings, of which Fig. 1 is a diagrammatic view showing the general arrangements for controlling the delivery of vehicles from two converging tracks in accordance with one form of my invention;

Fig. 2 being a similar view illustrating my invention as applied to a pair of diverging tracks.

Referring now first to Fig. 1, a pair of tracks A, B are indicated as converging into a single track C by means of stationary points D of any well-known type.

The track A is provided with a retarding or braking device 1, a controlling device 2, and a detecting device 3, so arranged as to be traversed in succession by the vehicles passing along the track A. The other track B is similarly provided with a retarding or braking device 4, a controlling device 5 and a detecting device 6, and the track C beyond the points D is provided with a special counting device 7.

The retarding devices 1 and 4 are preferably operated by the weight of the tubs themselves, their release being effected by fluid under pressure controlled by electro-pneumatically operated valves in such a manner that the retarding braking action is exerted upon the vehicles passing the devices 1 and 4 at all times except when the corresponding electro-magnets 8 and 9 are supplied with energizing current. The controlling devices 2, 5, may comprise a star wheel mechanism, the star wheel being rotated through a predetermined arc by the passage of each axle of a vehicle; as soon as a predetermined number of axles has passed the controlling device, corresponding to one complete revolution of the star wheel, the latter is automatically locked to prevent the passage of further vehicles, and can only be unlocked by supplying current to a releasing electro-magnet 10, 11 to unlock the mechanism which is returned to its locked position by current supplied to a locking electro-magnet 12, 13.

The controlling device 2 is provided with detector contacts 14 and 69, while the detector device 5 is provided with detector contacts 15 and 67, each adapted to close or to open a control circuit according to whether the controlling device be unlocked or locked.

The detecting devices 3, 6 may comprise treadles adapted to open normally closed contacts 16, 17, when a vehicle passes over the treadle.

The counting device 7 may comprise a star wheel mechanism adapted to be operated by the axles of the vehicles passing over the device, the shaft or spindle of the star wheel being provided with a disc or drum 18 carrying a contact segment 19 which, after a predetermined number of axles has passed over the device 7, electrically connects together a pair of fixed contacts 20 and after a further equal number of vehicles has passed connects together another pair of fixed contacts 21.

The controlling arrangements also comprise a pair of relays 22, 23, for controlling the operation of the controlling devices 2, 5, respectively.

The operation of the control system is as follows:

Assuming that the counting device 7 has been set into the position shown diagrammatically in Fig. 1 by the passage of a number of vehicles along the track C, the contact segment 19 has been brought into engagement with the fixed contacts 20 with the result that a circuit is completed from the positive terminal 24, through conductor 25, fixed contacts 20, conductor 26 the lower armature 27 of the relay 23, relay contact 28, conductor 29, the releasing magnet 11, to the negative terminal 30. The controlling device 5 is consequently unlocked and a circuit is completed from the positive terminal 31, through the closed detector contacts 15, conductor 32, the electro-magnet 9 of the retarding device 4, to the negative terminal 33. The retarding device 4 is consequently released and is free for the passage of the vehicles passing along the track B and the controlling device 5 being unlocked these vehicles are permitted to pass over the controlling device 5 towards the points D. As the first vehicle passes over the detecting device 6 the following circuit is interrupted at the detector contacts 17; from the positive terminal 34 through closed detector contacts 17, conductor 35, the upper armature 36 of the relay 23, conductor 37, through the relay winding 23, to the negative terminal 38. This circuit, which constitutes the retaining circuit of the relay 23 having been broken at the detector contacts 17, the relay is de-energized and the armatures 36 and 27 consequently fall to their lower or unattracted position, in which the armature 27 is in engagement with a lower contact 39.

The circuit previously traced through the conductor 26 is thus now completed through the relay contact 39, conductor 40, the locking electro-magnet 13 of the controlling device 5, to the negative terminal 30, with the result that the controlling device 5 is relocked and will prevent the further passage of vehicles over the device after a predetermined number of vehicles has passed.

The vehicles, after traversing the points D enter the track C and pass over the counting device 7, the passage of the vehicles causing the drum 18 to be rotated in the direction indicated by the arrow, so that the contact segment 19 is moved out of engagement with the stationary contacts 20. The circuit from the positive terminal 24 to the conductor 26 is thus interrupted and the locking electro-magnet 13 is de-energized without, however, affecting the action of the controller 5, the temporary energization of the locking electro-magnet 13 during the passage of the first vehicle from the detecting device 6 to the counting device 7 being for the purpose only of ensuring that the controller 5 shall be effectively relocked.

For the purpose of explaining the operation of the system it will be assumed that the controller 5 is so constructed as to permit the passage of six axles, corresponding to three vehicles, before being automatically relocked, and the relocking action effected by the temporary energization of the locking electro-magnet 13 causes the circuit from the positive terminal 31 through the electro-magnet 9 of the retarding device 4 to be interrupted at the contact 15 with the result that the retarding device 4 assumes its retarding position after the contact 15 is broken by the relocking of the controlling device 5. The axles of the three vehicles thus permitted to enter the track C effect the rotation of the star wheel of the counting device 7 through one-half of a complete revolution, with the result that as soon as the three vehicles have passed the counting device 7 the contact segment 19 comes into engagement with the stationary contacts 21. As a result, a circuit is completed from the positive terminal 24, through conductor 41, contact segment 19, stationary contacts 21, conductor 42, the lower armature 43 of the relay 22, stationary contact 44, conductor 45, the releasing electro-magnet 10 of the controlling device 2 to the negative terminal 46. The controlling device 2 is thus unlocked with the result that a circuit is completed from the positive terminal 47, through the detector contact 14, conductor 48, the electro-magnet 8 of the retarding device 1 to the negative terminal 49. The line of vehicles on the track A is thus permitted to move past the controlling device 2 and also over the retarding device 1 which is in its released position, and as soon as the first of these vehicles reaches the detecting device 3, the retaining circuit through the relay 22 is interrupted at the relay armature 50 in the manner already described with reference to vehicles passing along the track B.

The unlocking of the controlling device 2 also completes a circuit from the positive terminal 68 through contact 69, conductor 51, and relay winding 23 to the negative terminal 38, this circuit constituting the pick-up circuit for the relay 23 which is thus energized and restores the armatures 36 and 27 to the position shown in the drawing. The remainder of the operation of the system so far as the passage of vehicles from the track A to the track C is concerned is similar to that already described and it will thus be seen that a series of three vehicles is delivered alternately from the tracks A and B to the track C under conditions ensuring safety and rapidity in operation.

Referring now to Fig. 2, my invention is illustrated as applied to a system in which vehicles passing along a track A are to be delivered alternately in series or groups containing equal numbers of vehicles to two diverging tracks B and C past a set of points D. The latter are arranged to be moved from a position establishing communication between the tracks A and C to a position establishing communication between the tracks A and B, or vice versa, by means of a fluid pressure actuated motor 52, the supply of fluid under pressure to which is controlled by means of an electro-magnetically actuated valve, the electro-magnet winding of which is indicated at 53. The points D are arranged to be maintained in the position shown in which communication is established between the tracks A and C by means of a spring or the like, and to be moved to their opposite position in which communication is established between the tracks A and B when fluid under pressure is supplied to the motor 52 by the energization of the electro-magnet 53. The track A is provided with a controlling device 54 similar in construction to the corresponding devices already described with reference to the system of Fig. 1, the controlling device 54 being provided with a releasing electro-magnet 35, which when energized unlocks the controlling device 54 and permits the passage of a predetermined number of vehicles before the controlling device is relocked.

The controlling device 54 is also provided with a rotatable drum or disc 56 carrying a contact segment 57 adapted in certain positions of the drum 56 to connect stationary contacts 58 electrically together.

The operation of the system is as follows:—

Assuming that a line of vehicles is standing on the track A, their forward movement being prevented by the controlling device 54 which is assumed to be locked, the unlocking of this device is effected by the operator depressing a manually operated key or switch 59 thereby establishing a circuit, from the positive terminal 60 through the key 59, conductor 61, the releasing magnet 55, to the negative terminal 62. The controlling device 54 being thus unlocked, the vehicles are permitted to pass forward along the track A towards the points D the passage of the first axle of the series of vehicles over the controlling device 54 being arranged to effect a corresponding rotation of the drum 56 in the direction indicated by the arrow, so as to connect the stationary contacts 58 electrically together by means of the contact segment 57. As a result a circuit is completed from the positive terminal 63, through the contacts 58 and contact segment 57, conductor 64, the electro-magnet 53, to the negative terminal 65, and fluid under pressure is thus supplied to the motor device 52, to effect the setting of the points D to a position in which communication is established between the tracks A and B. The series of vehicles thus proceeds along the track A past the points D on to the track B, and as soon as a predetermined number of vehicles, for instance, three, has passed the controlling device 54, the latter is relocked and the further passage of vehicles to the track B is prevented. The passage of the three vehicles over the controlling device 54 causes the rotation of the drum 56 through one-half of a complete revolution, with the result that when the operator again presses the key 59 to unlock the controlling device 54 the contact segment 57 moves out of engagement with the stationary contacts 58 as soon as the first axle of the new series of vehicles passes over the controlling device 54. As a result, the electro-magnet 53 is de-energized and the points D return to the position shown in Fig. 2, so that the next successive group or series of three vehicles passing the controlling device 54 is delivered to the track C, the passage of the last axle of this group or series restoring the drum 56 to the position shown in the figure.

It will be thus be seen that the vehicles are delivered from the track A in groups or series of three vehicles to the tracks B and C alternately. It will be understood that the system shown in Fig. 2 may, if desired, be provided with retarding devices for the vehicles such as those indicated at 1 and 4 in Fig. 1, and that the delivery of the vehicles from the track A to the tracks B and C may be arranged to be automatic by providing a system of relays and axle counters or other apparatus such as that described in connection with Fig. 1, thus rendering the provision of the manually operated key 59 unnecessary.

My invention is evidently not limited to the employment of any particular type of retarding, controlling, or counting mechanism and in some cases the retarding mechanism may be embodied in the controlling device, or all three mechanisms may be embodied in a single unit. In these and other respects the arrangements above described may evidently be considerably modified without exceeding the scope of my invention.

Having now particularly described and ascertained the nature of my said invention and in what manner the same is to be performed, I declare that what I claim is:

1. In combination, a railway track, a vehicle controller arranged to lock after a given number of vehicles has passed, a retarder located in the rear of said controller and normally in condition to reduce the speed of vehicles, and means for releasing said retarder when said controller is unlocked but not when it is locked.

2. In combination, a railway track, a vehicle controller arranged to lock after a given number of vehicles has passed, a magnet for releasing said controller, and means controlled by vehicles for energizing said magnet.

3. In combination, a pair of converging tracks leading into a single track, a vehicle controller for each track arranged to lock after the passage of a given number of vehicles, and a counter operated by vehicles entering said single track for alternately releasing said controllers.

4. In combination, a pair of converging tracks leading into a single track, a vehicle controller for each track arranged to lock after the passage of a given number of vehicles, a counter operated by vehicles entering said single track, a magnet for each controller arranged when energized to release the controller, and means controlled by said counter for alternately energizing said magnets.

5. In combination, a railway track, a vehicle controller arranged to lock after a given number of vehicles has passed, a magnet for releasing said controller, and means controlled by a vehicle after passing said controller for de-energizing said magnet.

6. In combination, a pair of converging tracks leading into a single track, a vehicle controller for each track arranged to lock after the passage of a given number of vehicles, a retarder located in the rear of each controller and normally in condition to reduce the speed of vehicles approaching the controller, means for releasing each retarder when the associated controller is unlocked but not when it is locked, and means for releasing each controller after a given number of vehicles has entered said single track from the other converging track.

7. In combination, a pair of converging tracks leading into a single track, a vehicle controller for each track arranged to lock after the passage of a given number of vehicles, a retarder located in the rear of each controller and normally in condition to reduce the speed of vehicles approaching the controller, means for releasing each retarder when the associated controller is unlocked but not when it is locked, and means controlled by vehicles entering said single track for alternately releasing said controllers.

8. In combination, a pair of converging tracks leading into a single track, a vehicle controller for each track arranged to lock after the passage of a given number of vehicles, a retarder located in the rear of each controller and normally in condition to reduce the speed of vehicles approaching the controller, means for releasing each retarder when the associated controller is unlocked but not when it is locked, and a counter operated by vehicles entering said single track for alternately releasing said controllers.

9. In combination, a pair of converging tracks leading into a single track, a vehicle controller for each track arranged to lock after the passage of a given number of vehicles, a retarder located in the rear of each controller and normally in condition to reduce the speed of vehicles approaching the controller, means for releasing each retarder when the associated controller is unlocked but not when it is locked, a counter operated by vehicles entering said single track, a magnet for each controller arranged when energized to release the controller, and means controlled by said counter for alternately energizing said magnets.

10. In combination, a pair of converging tracks leading into a single track, a counter located in said single track for alternately closing two circuit controllers one for each converging track, a vehicle controller for each converging track arranged to lock after the passage of a given number of vehicles, a releasing magnet for each vehicle controller, a relay for each vehicle controller, a pick-up circuit for each relay including a contact closed only when the vehicle controller for the other converging track is unlocked, a stick circuit for each relay opened by a vehicle passing along the associated track in advance of the vehicle controller, and a circuit for each releasing magnet controlled by the associated relay and the corresponding counter-actuated circuit controller.

11. In combination, a pair of converging tracks leading into a single track, a counter located in said single track for alternately closing two circuit controllers one for each converging track, a vehicle controller for each converging track arranged to lock after the passage of a given number of vehicles, a releasing magnet for each vehicle controller, a relay for each vehicle controller, a pick-up circuit for each relay including a contact closed only when the vehicle controller for the other converging track is unlocked, a stick circuit for each relay opened by a vehicle passing along the associated track in advance of the vehicle controller, a retarder for each converging track located in the rear of the associated vehicle controller and normally in condition to reduce the speed of vehicles, a magnet for each retarder arranged when energized to release the controller, a circuit for each retarder magnet including a contact which is closed only when the associated vehicle controller is unlocked, and a circuit for each controller magnet controlled by the associated relay and the corresponding counter-actuated circuit controller.

12. In combination, a pair of converging tracks leading into a single track, a counter located in said single track for alternately closing two circuit controllers one for each converging track, and traffic governing means for said converging tracks controlled by said circuit controllers.

13. In combination, a pair of converging tracks leading into a single track, a counter located in said single track for alternately closing two circuit controllers one for each converging track, and vehicle controllers and retarders for said converging tracks controlled by said circuit controllers.

14. In combination, a pair of converging tracks leading into a single track, a vehicle counter located in said single track, a circuit controller operated by said counter, and traffic governing means for said converging tracks controlled by said circuit controller.

15. In combination, a pair of converging tracks leading into a single track, a vehicle counter located in said single track, a circuit controller alternately closed and opened by said counter, and traffic governing means for said converging tracks controlled by said circuit controller.

In testimony whereof I affix my signature.

DONALD F. BROWN.